April 10, 1934.   H. L. OLIVE ET AL   1,954,144
GREASE GUN NOZZLE
Filed Feb. 6, 1933
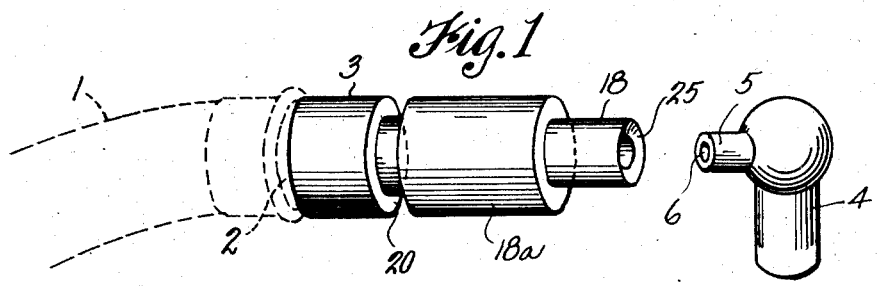
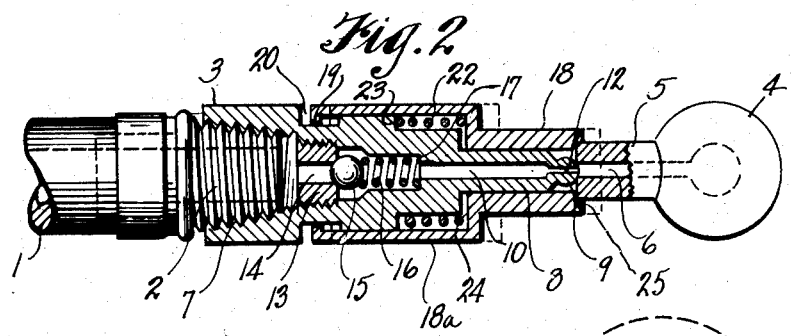
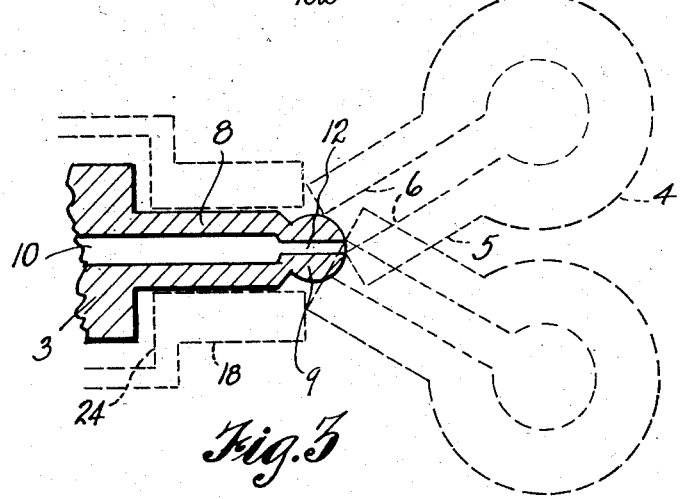
INVENTOR
HARRY L. OLIVE
MARTIN M. MITTET
BY
Cook & Robinson
ATTORNEY Patented Apr. 10, 1934

1,954,144

UNITED STATES PATENT OFFICE 1,954,144

GREASE GUN NOZZLE

Harry L. Olive and Martin M. Mittet,
Seattle, Wash.

Application February 6, 1933, Serial No. 655,324

3 Claims. (Cl. 285—161)

This invention relates to improvements in lubricating systems, and it has reference more particularly to the details of construction of a grease gun nozzle for use in connection with pressure systems as now commonly used for automobile lubrication, although not limited thereto.

It is the principal object of this invention to provide a grease gun nozzle for pressure lubricating, that is easily and readily applicable to the grease receiving nipples provided therefor and is operable to deliver the grease into the nipples without requiring that there be any attaching connection for holding it against separation from the nipple under pressure of the lubricant being delivered.

It is also an object of this invention to provide a nozzle that may be functionally applied to the receiving opening of a nipple at different angles without leakage.

Another object of the invention is to provide the nozzle with a spherical, or ball tip adapted to fit within the receiving opening of the nipple in a grease tight connection and within which ball tip is a delivery bore of relatively small diameter which will maintain registration with the receiving bore of the nipple for all the various angular positions of application of the nozzle thereto.

Another object of the invention resides in the provision of a yieldably mounted guide sleeve on the nozzle whereby shock will be taken up incident to application of the device, and whereby the spherical end will be guided accurately against the nipple bore.

More specifically stated, the present invention resides in the provision of a grease gun nozzle which may be threaded onto the delivery tube of the ordinary types of grease guns, or the like, and which may be easily and readily applied to grease receiving nipples at various angular positions, and without requiring an attached or fixed connection therewith in order to withhold ordinary lubricating pressures.

Other objects of the invention reside in the details of construction and in the combination of parts, as will presently be described.

In accomplishing these and other objects of the invention, we have provided the improved details of construction, the preferred forms of which are illustrated in the accompanying drawing, wherein, Fig. 1 is a perspective view of a grease gun nozzle embodied by the present invention, and a nipple to which the nozzle may be applied.

Fig. 2 is a sectional view of the nozzle embodied by this invention, as applied to the nipple.

Fig. 3 is an enlarged sectional detail of the end portion of the nozzle and illustrating various angular positions of application of the nozzle to the nipple.

Referring more in detail to the drawing—

1 designates what may be the discharge, or delivery hose of a grease gun and 2 is a threaded nipple fixed in the end of the tube 1 for the attachment thereto of the present nozzle, which is designated in its entirety by reference numeral 3. A grease receiving nipple, of a character suitable for use with the present nozzle, is designated at 4 and this has a laterally extending neck portion 5 provided with a centrally located grease receiving channel 6 of circular cross section. For a purpose presently understood, the neck 5 preferably will be of circular or tubular form, although this is not always essential.

In its preferred form of construction, the nozzle 3 is provided with an internally threaded socket 7 at one end for mounting the nozzle on the threaded nipple 2. At its outer end the nozzle has an axially extending neck 8 of reduced diameter provided at its end with a small spherical head 9. A channel 10 of various diameters is provided axially of the nozzle 6 and this provides for the delivery of grease from the hose through the nozzle. The spherical head 9 is provided with a relatively small hole or bore 12 from which the grease is discharged. This bore, in practice, is approximately one thirty second of an inch in diameter.

Threaded into the grease channel 10 of the nozzle at the base of the socket 7 is a ring like valve slot 13 provided with a central passage 14. A ball check 15 is held yieldingly against the inner end of the passage 14 by a small coiled spring 16 resting at one end against the ball and at its other end against an annular shoulder 17 formed in the channel 10. This ball check automatically closes the channel to prevent outflow of grease from the nozzle when the device is not in use.

It will be mentioned here that the bore 6 that opens to the end of the neck 5 and nipple 4 is relatively large in diameter as compared to the diameter of bore 12 of the nozzle end. Therefore, when the nozzle tip is applied to the nipple in a greasing operation, as seen in Fig. 2, the ball end 9 seats snugly against the end of the bore 6 and by reason of the spherical curvature of the ball and the circular form of the bore, this makes a grease tight line contact between the ball and nipple. Also, the movement of the nozzle to various angular positions will not cause any looseness of this connection, and as illustrated in Fig. 3, communication between the bore 12 and the bore 6 will be maintained for all angular positions of adjustment of the nozzle.

To aid in guiding the nozzle tip 9 into the bore 6 of the neck portion 5 of the nipple, we have slidably fitted a sleeve 18 on the outer end portion of the nozzle. This sleeve has an enlarged inner end portion 18a slidably fitted about a central portion of the nozzle. The longitudinal sliding movement of the sleeve on the nozzle is limited by means of an inturned flange 19 formed on the inner end of the sleeve for engaging with the opposite side surfaces of an annular groove 20 formed in the nozzle body. A coiled spring 22 is disposed about the nozzle inside of the sleeve to bear against an annular shoulder 23 on the nozzle and against an opposing shoulder 24 in the sleeve, thereby to yieldingly hold the sleeve at an extended position.

When the sleeve is thus extended, its outer end portion is somewhat beyond the ball end of the nozzle. This outer end portion of the sleeve is provided with an inwardly cupped end surface 25 preferably spherically curved against which the nipple end will engage during use of the device.

Assuming the device to be so constructed, it will be used in the following manner—

First, the nozzle is connected with the grease gun hose 1 by threading it onto the hose nipple 2. When a lubricant is to be applied to the nipple 4, the cupped end surface 25 of the sleeve 18 is applied against the end of the neck 5 with some pressure so that the spring 22 will be compressed and the ball end of the nozzle will be seated tightly within the bore 6 as seen in Fig. 3. The nozzle may be pivotally adjusted to assume various angular positions relative to the neck, so long as the bore 12 remains in registration with the bore 6. Then grease is applied through the nozzle by pressure sufficient to unseat the ball check 15 and the grease passes through the channels 10 and 12 and is delivered into the bore 6 to the nipple 4.

By reason of the small area of the ball that is exposed to the pressure of the grease within the bore 6, only a relatively light force is required to hold the gun in place while the grease is delivered under a high pressure into the nipple.

There is an advantage in the present device in that should the nipple opening 6 be dented or damaged from any cause, the hardened ball end 9 may be used to reform the seat by pressing the ball tightly against the seat and rotating it back and forth, thus to restore the grease tight connection.

The special advantages to be gained in use of the present device is that no devices are required for locking the nozzle onto the nipple during the application of grease, and no special position of the nozzle, relative to the nipple, is required for application of the grease. Furthermore, the provision of the sleeve for guiding the ball end of the nozzle against the bore of the nipple makes possible easy application of the nozzle, and the spring associated with the sleeve absorbs all shock incident to application of the nozzle, thereby lessening the danger of damage resulting from hard use of the device.

It is to be understood that the details of construction of the various parts might be changed without departing from the spirit of the invention and therefore it is not desired that the claims shall be limited only to the details herein shown, but that they shall be given an interpretation commensurate with the scope of the invention disclosed.

Having thus described our invention, what we claim as new therein and desire to secure by Letters Patent is—

1. The combination with a nipple having a grease receiving bore opening to the end thereof, of a grease gun nozzle formed with an axial grease delivery channel and terminating at its outer end in a spherically rounded end portion through which said axial channel opens in a bore of relatively small diameter, a sleeve slidably mounted on the nozzle, a yieldable means normally retaining the sleeve extended beyond the rounded end of the nozzle; said sleeve having a cupped end surface applicable against the nipple as a guide whereby the nozzle end will be seated against the nipple bore incident to inward depression of the sleeve.

2. The combination with a nipple having a grease receiving bore opening to the end thereof, a grease gun nozzle formed with an axial grease delivery channel and terminating at its outer end in a spherically rounded ball end through which said axial channel opens in a bore of relatively small diameter as compared with the nipple bore, a sleeve slidably on the nozzle, and yieldable means normally holding the sleeve extended beyond the ball end to engage with the nipple as a means of guiding the spherical end of the nozzle into the nipple bore.

3. A device as in claim 2 wherein the end of the sleeve is cupped to receive the end of the nipple.

HARRY L. OLIVE.
MARTIN M. MITTET.